United States Patent
Lin et al.

(10) Patent No.: US 9,503,302 B2
(45) Date of Patent: Nov. 22, 2016

(54) COMMUNICATION CIRCUIT AND ASSOCIATED METHOD FOR CALIBRATING COMMUNICATION CIRCUIT

(71) Applicant: MEDIATEK Inc., Hsin-Chu (TW)

(72) Inventors: Yu-Te Lin, New Taipei (TW); Tzyuan Shiu, Taipei (TW)

(73) Assignee: MEDIATEK INC., Hsin-Chu (TW)

(*) Notice: Subject to any disclaimer, the term of this patent is extended or adjusted under 35 U.S.C. 154(b) by 7 days.

(21) Appl. No.: 14/330,115

(22) Filed: Jul. 14, 2014

(65) Prior Publication Data

US 2015/0055691 A1 Feb. 26, 2015

Related U.S. Application Data

(60) Provisional application No. 61/870,056, filed on Aug. 26, 2013.

(51) Int. Cl.
| | | |
|---|---|---|
| *H04B 17/00* | (2015.01) | |
| *H04L 27/26* | (2006.01) | |
| *H04B 17/21* | (2015.01) | |
| *H04B 17/318* | (2015.01) | |
| *H04B 17/14* | (2015.01) | |

(52) U.S. Cl.
CPC ........... *H04L 27/2646* (2013.01); *H04B 17/21* (2015.01); *H04B 17/318* (2015.01); *H04B 17/0085* (2013.01); *H04B 17/14* (2015.01)

(58) Field of Classification Search
USPC .......... 455/69, 73, 63.1, 108, 517, 133, 137, 455/115.1; 375/224, 211, 221, 296, 267
See application file for complete search history.

(56) References Cited

U.S. PATENT DOCUMENTS

| | | | | |
|---|---|---|---|---|
| 6,037,898 A * | 3/2000 | Parish | ................... | H01Q 3/267 342/174 |
| 8,190,107 B1 * | 5/2012 | Gilbert | ..................... | H03D 1/10 455/108 |
| 8,649,418 B1 * | 2/2014 | Negus | .................. | H04B 7/0486 375/211 |
| 2004/0095907 A1* | 5/2004 | Agee | .................... | H04B 7/0417 370/334 |
| 2005/0070327 A1* | 3/2005 | Watanabe | ........... | H04M 1/0245 455/552.1 |
| 2008/0222571 A1* | 9/2008 | Yoshioka | ................ | A63F 13/06 715/841 |
| 2008/0231498 A1* | 9/2008 | Menzer | ..................... | G01S 7/28 342/134 |
| 2009/0011709 A1* | 1/2009 | Akasaka | ............... | H04W 24/00 455/41.3 |
| 2009/0186603 A1* | 7/2009 | Usami | ............. | H04M 1/274516 455/414.2 |

(Continued)

*Primary Examiner* — Ganiyu A Hanidu
(74) *Attorney, Agent, or Firm* — McClure, Qualey & Rodack, LLP

(57) ABSTRACT

The present invention provides a method for calibrating a communication circuit. In an embodiment, the method may include: cooperating start of a calibration procedure, and, by the communication circuit, signaling a calibration signal between a test equipment and the communication circuit. The calibration signal may include a plurality of coexisting component signals respectively at a plurality of calibration frequencies. Associated communication circuit is also disclosed.

21 Claims, 9 Drawing Sheets

(56) References Cited

U.S. PATENT DOCUMENTS

| | | | |
|---|---|---|---|
| 2010/0099363 A1* | 4/2010 | Faust | H04B 17/21 455/69 |
| 2010/0130254 A1* | 5/2010 | Kamada | H04L 63/0853 455/558 |
| 2010/0171659 A1* | 7/2010 | Waters | H04B 17/24 342/357.74 |
| 2010/0184379 A1* | 7/2010 | Shimomura | H04W 88/16 455/41.3 |
| 2011/0195670 A1* | 8/2011 | Dakshinamurthy | H01Q 3/2647 455/73 |
| 2012/0015778 A1* | 1/2012 | Lee | A63B 71/0622 482/8 |
| 2012/0020392 A1* | 1/2012 | O'Keeffe | H01Q 3/267 375/221 |
| 2012/0027066 A1* | 2/2012 | O'Keeffe | H01Q 1/246 375/224 |
| 2013/0102254 A1* | 4/2013 | Cyzs | H04B 1/126 455/63.1 |
| 2014/0023157 A1* | 1/2014 | Shimezawa | H04B 7/0456 375/267 |

* cited by examiner

COMMUNICATION CIRCUIT AND ASSOCIATED METHOD FOR CALIBRATING COMMUNICATION CIRCUIT

This application claims the benefit of U.S. provisional application Ser. No. 61/870,056, filed Aug. 26, 2013, the subject matter of which is incorporated herein by reference.

FIELD OF THE INVENTION

The present invention relates to communication circuit and associated method for calibrating communication circuit, and more particularly, to communication circuit and associated method for calibrating communication circuit with low time consumption, frequency error compensation, interference rejection, and/or thorough consideration of mutual influence between multiple paths of aggregate carriers.

BACKGROUND OF THE INVENTION

Communication devices, such as cell phones and smart phones adopting wireless 2G/3G/4G (LTE, long term evolution) mobile telecommunication standard(s), have become prevailing and essential for contemporary information society. To successfully establish mobile communication, communication devices need to be calibrated.

For example, while a communication device receives downlink signals (e.g., from base stations or node B's), it is expected to correctly measure received downlink power over a frequency range, e.g., a band/channel, or a sub-band/sub-channel as a portion of a band/channel. However, communication device unavoidably suffers non-uniform power measurement accuracy over wide frequency range. Thus, gain calibration is applied to communication device to understand power measurement accuracy over the frequency range. As mobile telecommunication evolves for higher data throughput, the aforementioned frequency range becomes much wider. For example, the frequency range may be 60 MHz for LTE.

To evaluate power measurement accuracy over a frequency range, the frequency range is resolved to several frequencies; e.g., a frequency range of 60 MHz may be resolved to 10 frequencies by a 6 MHz separation between every two adjacent frequencies. Conventionally, gain calibration is performed by: from a test equipment, supplying a single CW (continuous wave) tone of a first resolving frequency to the communication device to evaluate power measurement accuracy at the first resolving frequency, and supplying a single CW tone of a second resolving frequency to the communication device to evaluate power measurement accuracy at the second resolving frequency, and so forth. Accordingly, if the frequency range is resolved to a number K of frequencies, then the convention gain calibration needs K iterations.

In addition, communication device is capable of providing several gain modes, so received signal can be amplified by different gains respectively in different gain modes. Because communication device may utilize either one of the gain modes to receive signals, power measurement accuracies respectively in different gain modes need to be calibrated. That is, to cover a number N of gain modes and a number K of frequencies resolving the frequency range, the convention gain calibration takes N*K iterations (pts). Hence, the convention gain calibration is inefficient because so many iterations consume much calibration resources, including time and cost.

SUMMARY OF THE INVENTION

To address issues of conventional calibration, the present invention provides improved calibration technique. For example, to calibrate power measurement accuracy of a communication device over a frequency range in a certain gain mode, a calibration signal, including multiple coexisting component signals respectively at multiple different frequencies, may be supplied from a test equipment (e.g., calibration instrument) to the communication device; accordingly, power measurement accuracy at the multiple frequencies may be evaluated by only one single iteration.

Similarly, to calibrate transmit power accuracy of a communication device over a frequency range in a certain gain mode, a calibration signal including multiple coexisting component signals respectively at multiple different frequencies may be supplied from the communication device to a test equipment; hence, transmit power accuracy at the multiple frequencies may also be evaluated by only one single iteration.

An objective of the invention is providing a method for calibrating a communication circuit, e.g., a digital application processor of a communication device. The method may include: cooperating start of a calibration procedure (e.g., with a test equipment), and, by the communication circuit, signaling (receiving and/or transmitting) a calibration signal between the test equipment and the communication circuit; e.g., receiving the calibration signal from the test equipment, and/or transmitting the calibration signal to the test equipment. The calibration signal includes a plurality of coexisting component signals respectively at a plurality of calibration frequencies.

Regarding power measurement accuracy, the method may further include: by the communication circuit, demodulating (e.g., digitally down-converting) the signaled (e.g., received) calibration signal by a plurality of demodulation frequencies to respectively obtain a plurality of baseband signals; and, for calibration (e.g., evaluation of power measurement accuracy) over a frequency range, respectively calculating powers of the plurality of baseband signals. Calculating powers of the plurality of baseband signals may include: by the communication circuit, averaging squared absolute values of each baseband signal to obtain power of each baseband signal.

Before and/or during demodulating the signaled calibration signal, the method may further include: performing a frequency error compensation by tuning values of the plurality of demodulation frequencies. By frequency error compensation, the method may facilitate interference rejection, because demodulation and power calculation may suppress interference(s) which occurs at frequency (or frequencies) other than the demodulation frequencies and consequently contaminate the calibration signal received by the communication circuit.

For calibrating either power measurement accuracy or transmit power accuracy, each of the component signals forming the calibration signal may be a single tone; as a special case, the plurality of coexisting component signals may be organized according to OFDM (orthogonal frequency-division multiplexing) to form the calibration signal.

In an embodiment, the communication circuit is capable of signaling (receiving and/or transmitting) in a plurality of modes (e.g., gain modes), such as a first mode and a second mode. While the aforementioned calibration signal is signaled in the first mode for calibration at the plurality of calibration frequencies, the method may further include: in the second mode, signaling a second calibration signal which includes a number (one or more) of coexisting second component signals respectively at same number of second calibration frequencies, so as to calibrate at the second calibration frequency (or frequencies) in the second mode.

An objective of the invention is providing a communication circuit capable of implementing aforementioned method. The communication circuit may include an interface and a calibration block. The calibration block is capable of cooperating start of a calibration procedure. During the calibration procedure, the interface is capable of signaling a calibration signal between a test equipment and the communication circuit, wherein the calibration signal includes a plurality of coexisting component signals respectively at a plurality of calibration frequencies.

The communication circuit may further include a demodulation block. The demodulation block is coupled to the interface, and capable of demodulating the signaled calibration signal by a plurality of demodulation frequencies to respectively obtain a plurality of baseband signals; and, the calibration block is further capable of calculating powers of the plurality of baseband signals. The calibration block may calculate powers of the plurality of baseband signals by averaging squared absolute values of each baseband signal.

Along with the demodulation block, the communication circuit may further include a frequency setting block, which is coupled to the demodulation block, and capable of performing a frequency error compensation by tuning values of the plurality of demodulation frequencies.

In an embodiment, the interface is capable of signaling in a plurality of modes, and the calibration signal is signaled in a first one of the modes during the calibration procedure. The interface is further capable of, in a second one of the modes, signaling a second calibration signal between the test equipment and the communication circuit. The second calibration signal may include a number (one or more) of coexisting second component signals respectively at same number of second calibration frequencies.

With evolution of telecommunication standards, new communication schemes are offered, such as NCCA (non-continuous carrier aggregation). Under NCCA, a communication device may receive signals of different carrier frequencies, respectively via different paths, such as a first path and a second path. Each path may individually operate in one of a plurality modes. Ideally, performance of each path is expected to be uncorrelated to performance of other path(s); however, in reality, performance of each path will be affected by other path(s). To actually reflect unavoidable mutual correlation between paths, the invention proposes to calibrate one path in context of various modes of other path(s).

An objective of the invention is providing a method for calibration a communication circuit capable of signaling (receiving and/or transmitting) by carrier aggregation via a first path in a plurality of first modes, and via a second path in a plurality of second modes. The method may include: by the communication circuit, signaling a first calibration signal via the first path in a first one of the first modes and via the second path in a second one of the second modes, between a test equipment and the communication circuit; and, signaling a second calibration signal via the first path in a third one of the first modes and via the second path in a fourth one of the second modes, between the test equipment and the communication circuit; wherein the second one of the second modes is different from the fourth one of the second modes; and, the third one of the first modes is identical to the first one of the first modes, or the fourth one of the second modes. Hence, performance of the first path in the first modes may be evaluated in context of the second modes of the second paths.

The first calibration signal may include a first number (one or more) of first component signals respectively at same number of first calibration frequencies. If the first number is greater than one, the method may further include: demodulating the first calibration signal signaled via the first path by a second number of first demodulation frequencies to respectively obtain same number of first baseband signals; and, for gain calibration (e.g., evaluation of power measurement accuracy) at the first number of first calibration frequencies in the first one of the first mode and in context of the second one of the second modes, calculating powers of the second number of first baseband signals by averaging squared absolute values of each first baseband signal.

Alternatively, If the first number is equal to one, the method may further include: for gain calibration at the single calibration frequency in the first one of the first mode and in context of the second one of the second modes, calculating power of the first calibration signal by averaging squared absolute values of the first calibration signal.

An objective of the invention is providing a communication circuit, which may include an interface and a calibration block. The interface is coupled to a first path and a second path of carrier aggregation, and capable of signaling via the first path in a plurality of first modes and via the second path in a plurality of second modes. The calibration block is capable of: causing the interface to signal a first calibration signal via the first path in a first one of the first modes and via the second path in a second one of the second modes, between a test equipment and the communication circuit; and, causing the interface to signal a second calibration signal via the first path in a third one of the first modes and via the second path in a fourth one of the second modes, between the test equipment and the communication circuit; wherein the second one of the second modes is different from the fourth one of the second modes; and, the third one of the first modes is identical to the first one of the first modes, or the fourth one of the second modes.

The first calibration signal may include a first number (one or more) of first component signals respectively at same number of first calibration frequencies. The communication circuit may further include a first demodulation block, which is coupled to the first path, and capable of demodulating the first calibration signal signaled via the first path by a second number of first demodulation frequencies to respectively obtain same number of first baseband signals; the second number may equal the first number. If the first number is greater than one, the first calibration performed by the calibration block may include: averaging squared absolute values of each first baseband signal the calibration block. If the first number is equal to one, the first calibration performed by the calibration block may include: averaging squared absolute values of the first calibration signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
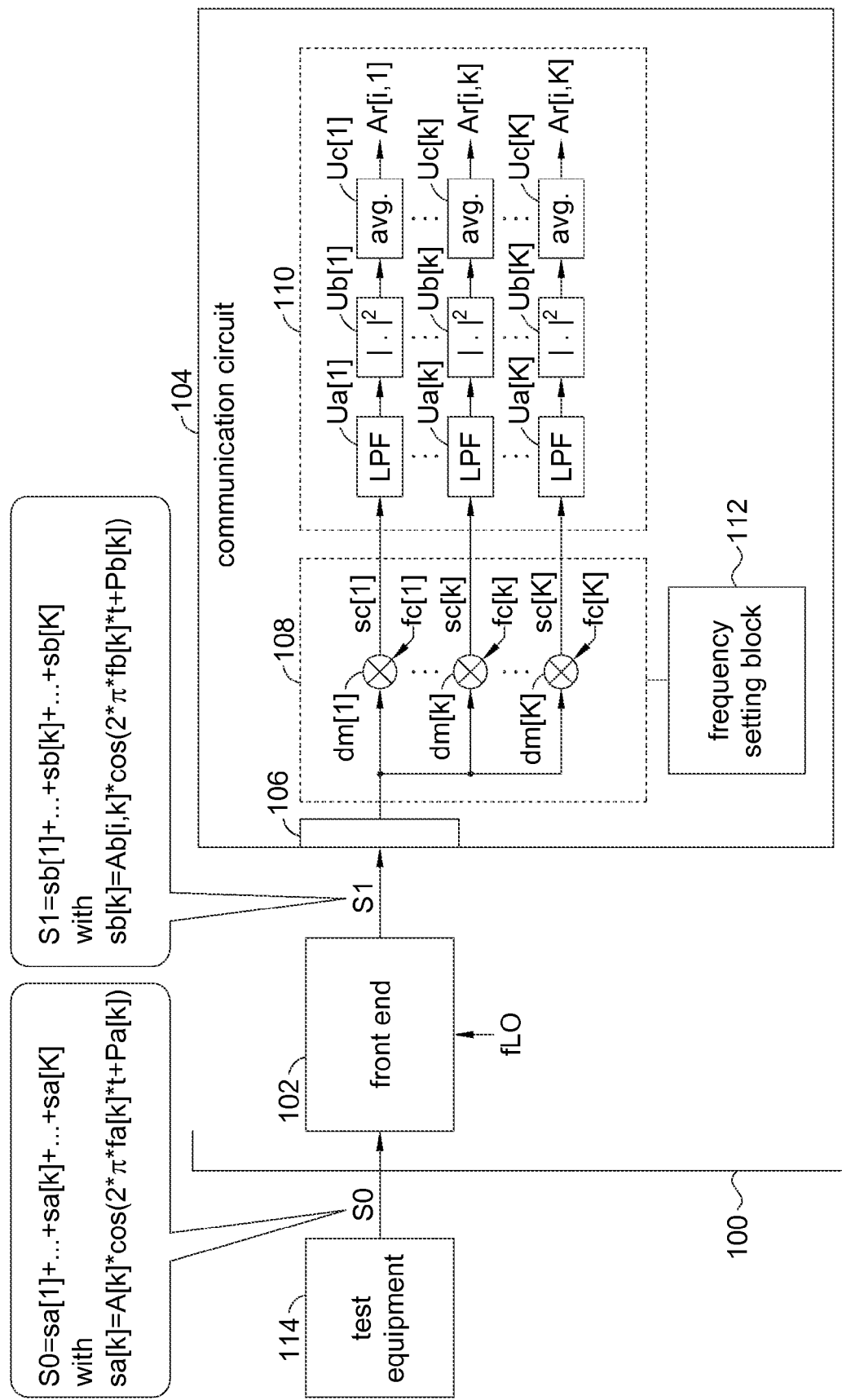
FIG. 1 illustrates a communication device according to an embodiment of the invention.
Figure 2:
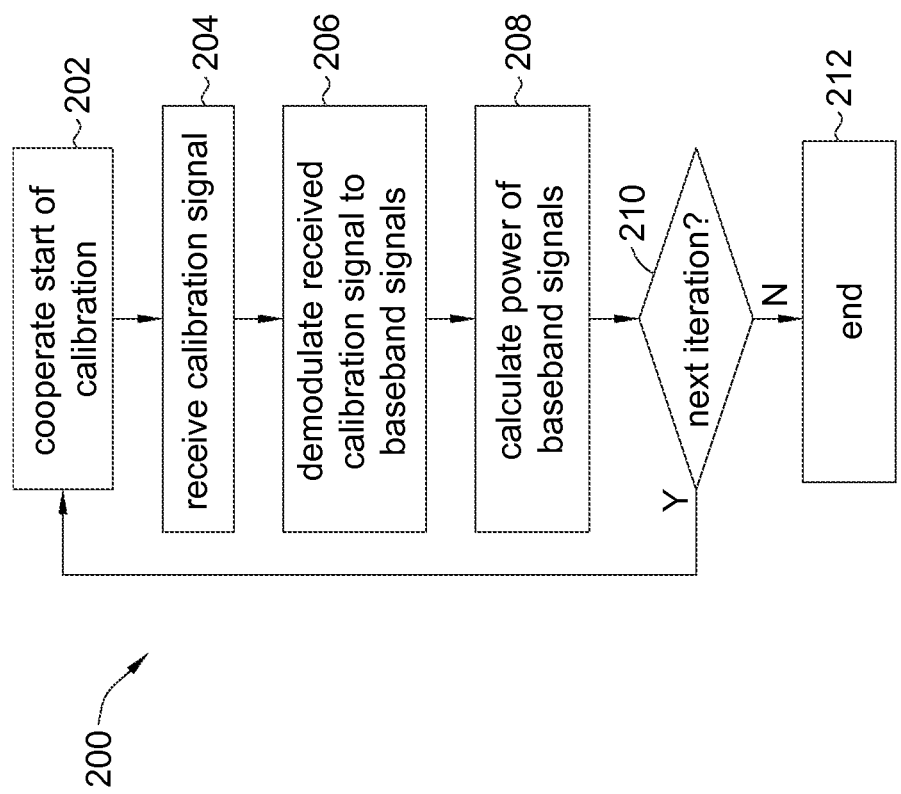
FIG. 2 illustrates a flowchart according to an embodiment of the invention, applicable to the communication device in FIG. 1.

Please refer to FIG. 1 and FIG. 2, respectively illustrating a communication device 100 and a flowchart 200 according to an embodiment of the invention. The communication device 100 may include a front end 102 and a communication circuit 104, and may adopt the flowchart 200 to calibrate power measurement accuracies of the communication device 100 in cooperation with an external test equipment 114.

As shown in FIG. 1, to implement the flowchart 200 according to the invention, the test equipment 114 may be a signal source capable of synthesizing a calibration signal S0, which may include a plurality of coexisting component signals sa[1] to sa[K]. For example, each component signal sa[k] (for k=1 to K) may be a sinusoidal time varying signal expressed by $A[k]*\cos(2**fa[k]*t+Pa[k])$, with terms $A[k]$, $fa[k]$ and $Pa[k]$ respectively being an amplitude, a frequency and a phase of the component signal sa[k]. For different component signals sa[k1] and sa[k2], the frequencies fa[k1] and fa[k2] may be different. Collectively, the component signals sa[1] to sa[K] are respectively at different calibration frequencies fa[1] to fa[K].

To calibrate power measurement accuracy over a frequency range (e.g., a band/channel or a sub-band/sub-channel of a telecommunication standard such as 2G, 3G, or LTE), the frequencies fa[1] to fa[K] may be arranged to distribute over the frequency range, e.g., evenly or unevenly divide the frequency range, so as to resolve the frequency range. For example, the frequency fa[k] may equal to (f_LB+k*df), with the term f_LB being a starting frequency equal to or greater than a lower bound of the frequency range, and the term df being a frequency separation with (f_LB+K*df) equal to or less than an upper bound of the frequency range. In an embodiment, each component signal sa[k] may be a single CW tone of frequency fa[k]; the signal S0 therefore may be a multi-tone signal including multiple single tones. In an alternative embodiment, the component signals sa[1] to sa[K] may be organized according to OFDM (orthogonal frequency-division multiplexing) baseband signal generation to form the signal S0; that is, the frequencies fa[1] to fa[K] are subcarriers of OFDM.

In the communication device 100, the front end 102 may be an RF analog front end capable of receiving the signal S0 and accordingly providing a calibration signal S1 in response. The communication circuit 104 may be a digital baseband processor, a digital application processor or any other circuit capable of calibrating power measurement accuracy of the communication device 100 according to the signal S1. The front end 102 may include one, some or all of the following: diplexer, coupler, antenna switch module (ASM), duplexer, mixer (down-converter) and amplifier (e.g., low noise amplifier, LNA).

While receiving signal, the front end 102 may operate in a plurality of modes. For example, the modes may be gain modes; in different gain modes, the front end 102 may amplify the signal S0 respectively by different gains, and accordingly provide the amplified signal S1. Since the signal S0 may include the component signals sa[1] to sa[K], the signal S1 may also include same number of component signals sb[1] to sb[K]. In an i-th mode, each component signal sb[k] (for k=1 to K) may be expressed by $Ab[i,k]*\cos(2**fb[k]*t+Pb[k])$, with terms $Ab[i,k]$, $fb[k]$ and $Pb[k]$ respectively being an amplitude in the i-th mode, a frequency (also as a calibration frequency) and a phase of the component signal sb[k]. For example, the frequency fb[k] may equal to (fa[k]−fLO) with the term fLO being a local oscillation frequency for down-conversion of the front end 102. A ratio Ab[i,k]/A[k] may represent a gain (and path loss) caused by the front end 102, in the i-th mode and at the frequency fa[k]; accordingly, measuring the amplitude Ab[i,k] (under known amplitude A[k]) may reveal power measurement accuracy in the i-th mode and at the frequency fa[k]. Because the signal S1 may include multiple coexisting signals sb[1] to sb[K] of amplitudes Ab[i,1] to Ab[i,K], power measurement accuracy in the i-th mode and at the multiple frequencies fa[1] to fa[K] can be calibrated efficiently.

To obtain the amplitudes Ab[i,1] to Ab[i,K] for calibration, the communication circuit 104 may include an interface 106, a demodulation block 108 and a calibration block 110. The interface 106 is capable of signaling the calibration signal S1 between the test equipment 114 and the communication circuit 104, e.g., receiving the calibration signal S0 from the test equipment 114 to the communication circuit 104 via the front end 102, which may down-convert the signal S0 to the signal S1. The demodulation block 108 is coupled to the interface 106, and capable of demodulating the signal S1 and accordingly obtain baseband signals sc[1] to sc[K], wherein amplitudes of the baseband signals sc[1] to sc[K] may be indicative of the amplitudes Ab[i,1] to Ab[i,K].

If the signal S0 is formed by OFDM, the demodulation block 108 may be an OFDM demodulator capable of applying inverse fast Fourier transform to the signal S1 to obtain the amplitudes Ab[i,1] to Ab[i,K]. More generally, as shown in FIG. 1, if the signal S0 is a multi-tone signal, the demodulation block 108 may include demodulation (e.g., digital down-conversion) units dm[1] to dm[K] capable of demodulating (e.g., down-converting) the calibration signal S1 by demodulation frequencies fc[1] to fc[K] to respectively obtain baseband signals sc[1] to sc[K].

The calibration block 110 is capable of calculating powers of the baseband signals sc[1] to sc[K], and hence obtain calibration results Ar[i,1] to Ar[i,K] indicative of the amplitudes Ab[i,1] to Ab[i,K], respectively. Accordingly, the calibration results Ar[i,1] to Ar[i,K] may represent power measurement accuracy in the i-th mode, at the frequencies fa[1] to fa[K].

As shown in FIG. 1, the calibration block 110 may include filter units (e.g., digital low-pass filter, LPF) Ua[1] to Ua[K], absolute value squaring units Ub[1] to Ub[K], and average units Uc[1] to Uc[K]. For k=1 to K, the unit Ua[k] may be coupled to the signal sc[k] for filtering the signal sc[k]; the unit Ub[k] may be coupled to the unit Ua[k] for taking square of absolute value of the filtered signal sc[k]; and, the unit Uc[k] is coupled to the unit Ub[k] for averaging operation results of the unit Ub[k]. That is, the calibration block 110 may calculate powers of signals sc[1] to sc[K] by averaging squared absolute values of each baseband signal sc[k] using the units Ua[k], Ub[k] and Uc[k].

By the units dm[k], Ua[k], Ub[k] and Uc[k], the communication circuit 104 may implement interference rejection, because demodulation and power calculation may suppress interference(s) contaminating the calibration signal S1 at frequency (or frequencies) other than the frequencies fc[1] to fc[K]. The unit Uc[k] may be merged to the unit Ua[k]; alternatively, the unit Ua[k] may be merged to the unit Uc[k].

While the front end 102 down-converts the signal S0 to S1 by the frequency fLO, the frequency fLO may have an ideal value compliant with the frequencies fa[1] to fa[K] of the test equipment 114. However, in reality, the frequency fLO may suffer a frequency offset (error) from its ideal value. To compensate the frequency error of the frequency fLO, the communication circuit 104 may further include a frequency setting block 112 coupled to the demodulation block 108. If the signal S0 is formed by OFDM, the frequency setting block 112 may tune frequency and/or phase of the signal S1 in time domain and/or frequency domain, so as to compensate the frequency error.

More generally, if the signal S0 is a multi-tone signal, the frequency setting block 112 may perform frequency error compensation by tuning values of the frequencies fc[1] to fc[K]. While the ideal value of the frequency fLO should causes a frequency sum (fc[k]+fLO) to equal the frequency fa[k] of the test equipment 114, the frequency sum (fc[k]+fLO) may shift away from the frequency fa[k] due to frequency error. To compensate the frequency error, the frequency setting block 112 may tune value of the frequency fc[k], so the equation (fc[k]+fLO)=fa[k] remains true even when the frequency fLO suffers frequency offset.

As shown in FIG. 2, the flowchart 200 may be adopted to calibrate power measurement accuracy of the communication circuit 104 over a frequency range and in different modes (e.g., gain mode); the flowchart 200 may include the following steps.

Step 202: by the calibration block 110 (FIG. 1), cooperate start of a calibration procedure including subsequent steps 204, 206 and 208; during the calibration procedure, the test equipment 114 may supply the signal S0 which includes the component signals sa[1] to sa[K] at the frequencies fa[1] to fa[K] (e.g., RF frequencies), and the front end 102 may be arranged (e.g., by control of the communication circuit 104) to operate in a same mode, e.g., an i-th mode. In an embodiment, the frequencies fa[1] to fa[K] may be arranged to distribute over the entire frequency range; alternatively, the frequencies fa[1] to fa[K] may be arranged to distribute only over a portion of the frequency range. The calibration block 110 (FIG. 1) may cooperate with the test equipment 114 to start the calibration procedure by, e.g., preparing the interface 106 for subsequent steps.

Step 204: by the interface 106 of the communication circuit 104, receiving the calibration signal S0 sent from the test equipment 114 to the communication circuit 104 via the front end 102, which provides the signal S1 in response. The signal S1 includes the coexisting component signals sb[1] to sb[K] respectively at the frequencies fb[1] to fb[K].

Step 206: by the demodulation block 108 of the communication circuit 104, demodulate (e.g., digitally down-convert) the calibration signal S1 by frequencies fc[1] to fc[K] to respectively obtain the baseband signals sc[1] to sc[K].

Step 208: by the calibration block 110 of the communication circuit 104, calculate powers of the signals sc[1] to sc[K] to respectively obtain the calibration results Ar[i,1] to Ar[i,K] indicative of power measurement accuracy at the frequencies fa[1] to fa[K], in the i-th mode. The calibration block 110 may calculate power of the signals sc[1] to sc[K] by averaging squared absolute values of each signal sc[k] to accordingly obtain the calibration result Ar[i,k]. Steps 204, 206 and 208 may last for a predetermined interval; while setting time length of the interval, several factors may be considered, such as effectiveness of interference rejection. For example, a longer interval may benefit interference rejection, because interference may be averaged out over more (longer) accumulations in step 208.

Step 210: if there is a need to calibrate for another mode and/or another portion of the frequency range, proceed to step 202 to iterate the calibration procedure of steps 204, 206 and 208; otherwise, proceed to step 212. For example, the flowchart 200 may iterate to step 202 for calibrate power measurement accuracy in an (i+1)-th mode; for calibration in the (i+1)-th mode, the front end 102 may switch to operate in the (i+1)-th mode, so another set of calibration results Ar[i+1,1] to Ar[i+1,K] may be obtained by steps 204, 206 and 208.

For another example, the frequency range to be calibrated may further be divided to several portions, such as a first portion and a second portion. The first portion may be resolved by frequencies fas[1] to fas[K1], and the second portion may be resolved by frequencies fas[K1+1] to fas[K2]. To calibrate over the frequency range in the same i-th mode, steps 202, 204, 206 and 208 may be executed for a first iteration, during which the front end 102 is arranged to operate in the i-th mode, and the frequencies fa[1] to fa[K] are arranged to equal the frequencies fas[1] to fas[K1]; then, the procedure 200 may branch back to step 202 from step 210, so steps 202 204, 206 and 208 may be executed for a second iteration, during which the front end 102 may still be arranged to operate in the i-th mode, but the frequencies fa[1] to fa[K] are rearranged to equal the frequencies fas[K1+2] to fas[K2].

During different iterations of steps 202, 204, 206 and 208, value of the number K, and/or values of the frequencies fa[1] to fa[K], may remain constant; alternatively, value of the number K and/or values of the frequencies fa[1] to fa[K] may also be changed when an iteration ends and another iteration begins.

Step 212: end the flowchart 200.

The calibration results Ar[i,1] to Ar[i,K] of each mode may be programmed (written) into the communication device 100 for later use. For example, under a cellular network of mobile telecommunication, a communication device (e.g., a terminal) may be arranged to monitor powers respectively broadcast by several neighboring base stations, besides currently serving base station; if broadcast power of a neighboring base station is stronger than that of the currently serving base station, handover of serving base station may be initialized. To ensure correct operation of the handover mechanism, accurate power monitoring is essential. Because different base stations may broadcast at different frequencies of a frequency range, power measurement accuracy at different frequencies of the frequency range may be calibrated (measured), and accordingly compensated, so as to maintain a uniform power measurement accuracy over the frequency range.

Besides steps 202, 204, 206, 208 and 210, the flowchart 200 may further include a step (not shown) of: by the frequency setting block 112, performing a frequency error compensation by tuning values of the frequencies fc[1] to fc[K], before and/or during demodulation in step 206, so as to overcome frequency offset of the frequency fLO. In an embodiment, the frequency error compensation may be performed as a phase of calibration (e.g., in cooperation with the test equipment) before execution of the flowchart 200. In another embodiment, the communication device 100 (FIG. 1) may include a frequency tracking circuit (not shown), such as a phase lock loop, capable of detecting frequency offset, so frequency error compensation may be executed along with step 206. Correct frequency error compensation is essential for high-performance interference rejection. Please note that the steps mentioned above are for illustration only, but not limitation. According to different design requirements, the order of the steps may be changed, one or more of the steps may be omitted, and one or more steps may be added before or after any of the steps mentioned above.

While forming the signal S0 by the component signals sa[1] to sa[K] of the frequencies fa[1] to fa[K], if the frequencies fa[1] to fa[K] are subcarriers of OFDM, frequency difference between any two adjacent frequencies fa[k] and fa[k+1] may be a constant compliant with OFDM standard, so as to satisfy orthogonal relation between subcarriers. However, more generally, the signal S0 may be a multi-tone signal, and the frequency difference between any two adjacent frequencies fa[k] and fa[k+1] may be more flexible (e.g., not bound to OFDM standard), and may be a constant or not. That is, a frequency difference (fa[k1+1]−fa[k1]) may be equal to or different from a frequency difference (fa[k2+1]−fa[k2]), for k1 and k2 being different indices selected from 1 to K.

Figure 3:
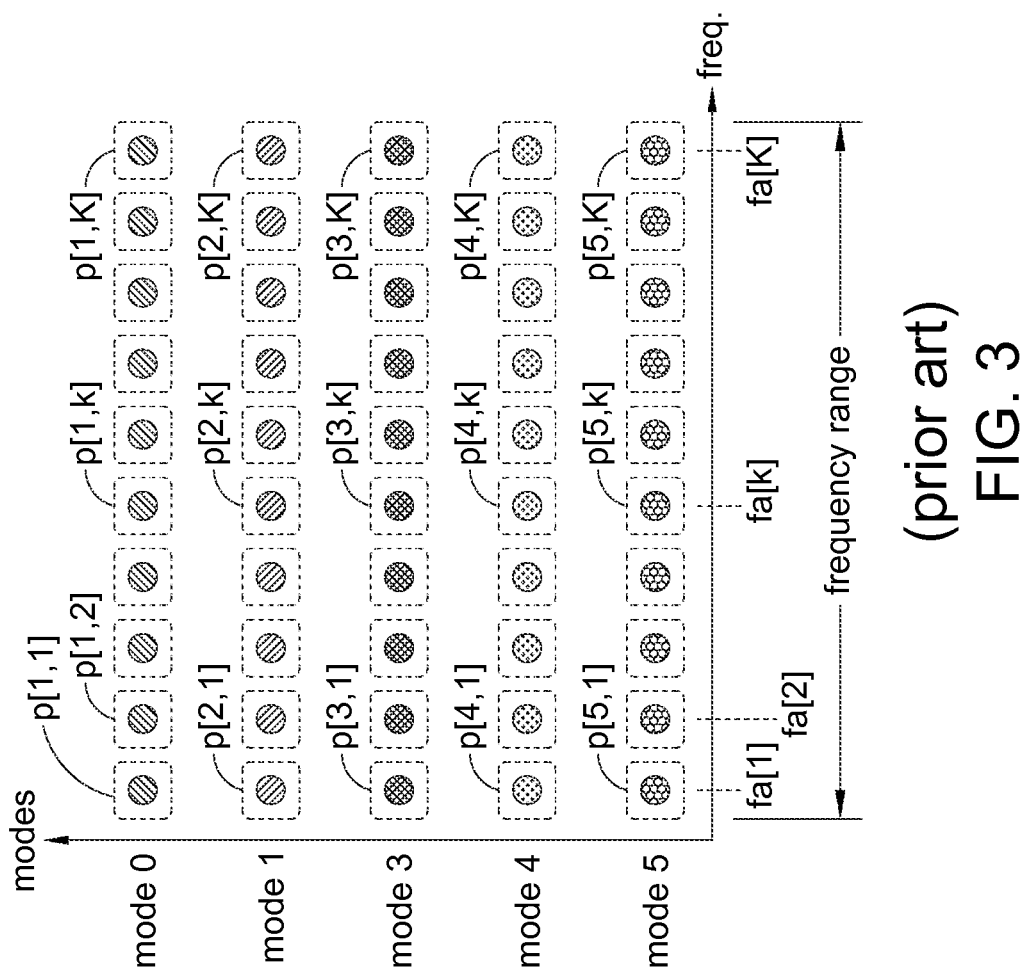
FIG. 3 illustrates calibration of a prior art.
Figure 4:
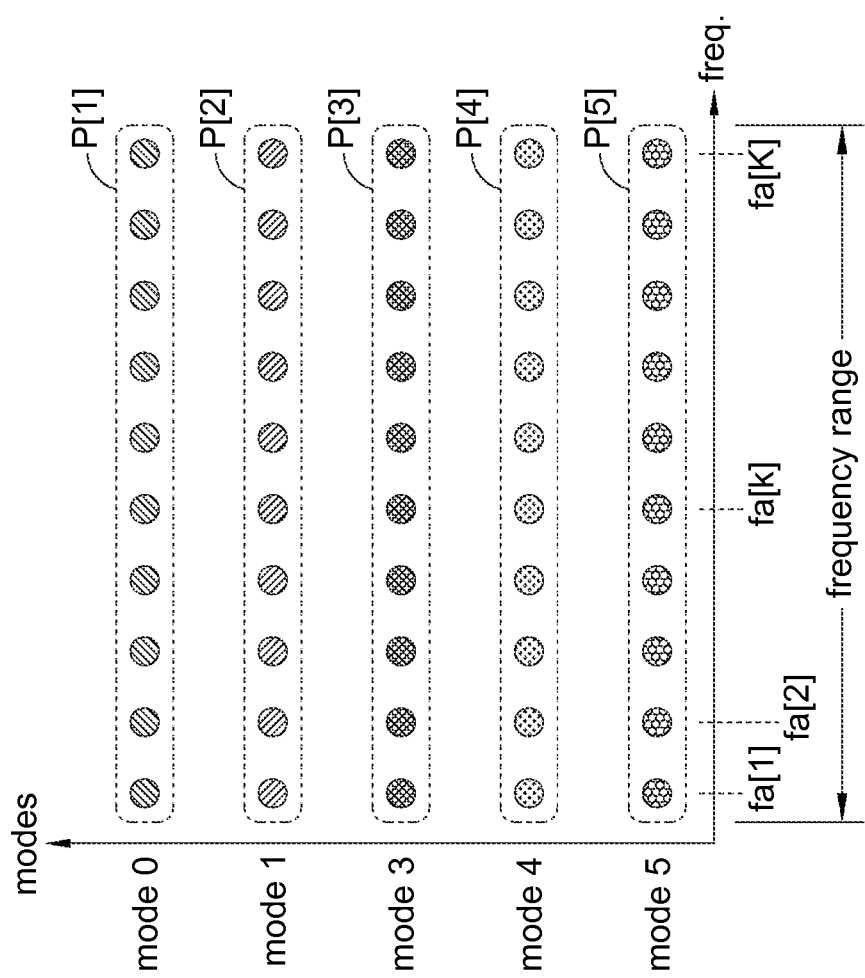
FIG. 4 illustrates calibration according to the flowchart of FIG. 2.

Along with FIG. 1 and FIG. 2, please refer to FIG. 3 and FIG. 4 comparing calibration iterations of prior art (FIG. 3) and the invention (FIG. 4), while calibrating over five modes and a frequency range divided by frequencies fa[1] to fa[K], e.g., K=10. In FIG. 3 and FIG. 4, each circular dot associates with one of the five modes and one of the frequencies fa[1] to fa[K], and represents a performance sample should be measure (calibrated); and, each rectangular (in dashed line) represents a calibration iteration (point).

As shown in FIG. 3, the prior art feeds a single tone during each calibration iteration, thus only a single performance sample at a single frequency is calibrated in each calibration iteration. The prior art first initializes a calibration iteration p[1,1] to calibrate a performance sample in mode 0 at frequency fa[1], and then initializes a second calibration iteration p[1,2] to calibrate a performance sample in mode 0 at frequency fa[2], and so forth; that is, the prior art needs to initialize a calibration iteration p[1,k] to calibrate a performance sample in mode 0 at frequency fa[k]. Accordingly, the prior art requires a number K of iterations p[1,1] to p[1,K] to finish calibration over the frequency range in mode 0. Then the prior art needs iterations p[2,1] to p[2,K] for calibration over the frequency range in mode 1, and so forth. Finally, to complete calibration covering five modes and K frequencies, the prior art requires 5*K calibration iterations (from iteration p[1,1] to p[5,K]), e.g., 5*10 pts if K=10.

On the other hand, as shown in FIG. 4, by adopting calibration technique of the invention to leverage a calibration signal composed by the frequencies fa[1] to fa[K], a single calibration iteration P[1] (e.g., a single execution of steps 202 to 208) may cover a number K of performance samples at frequencies fa[1] to fa[K] in the mode 0. Similarly, a single calibration iteration P[2] may cover a number K of performance samples at frequencies fa[1] to fa[K] in the mode 1, and so forth. Hence, to complete calibration covering five modes and K frequencies, the invention may utilize only 5 calibration iterations (pts), from iteration P[1] to P[5].

By comparing FIG. 3 and FIG. 4, it is therefore understood that the invention can greatly enhance calibration efficiency by reducing required calibration iterations. In addition, the prior art lacks ability of interference rejection, because the prior art directly measures squared absolute signal value down-converted by analog front end, without digital demodulation and filtering.

Figure 5:
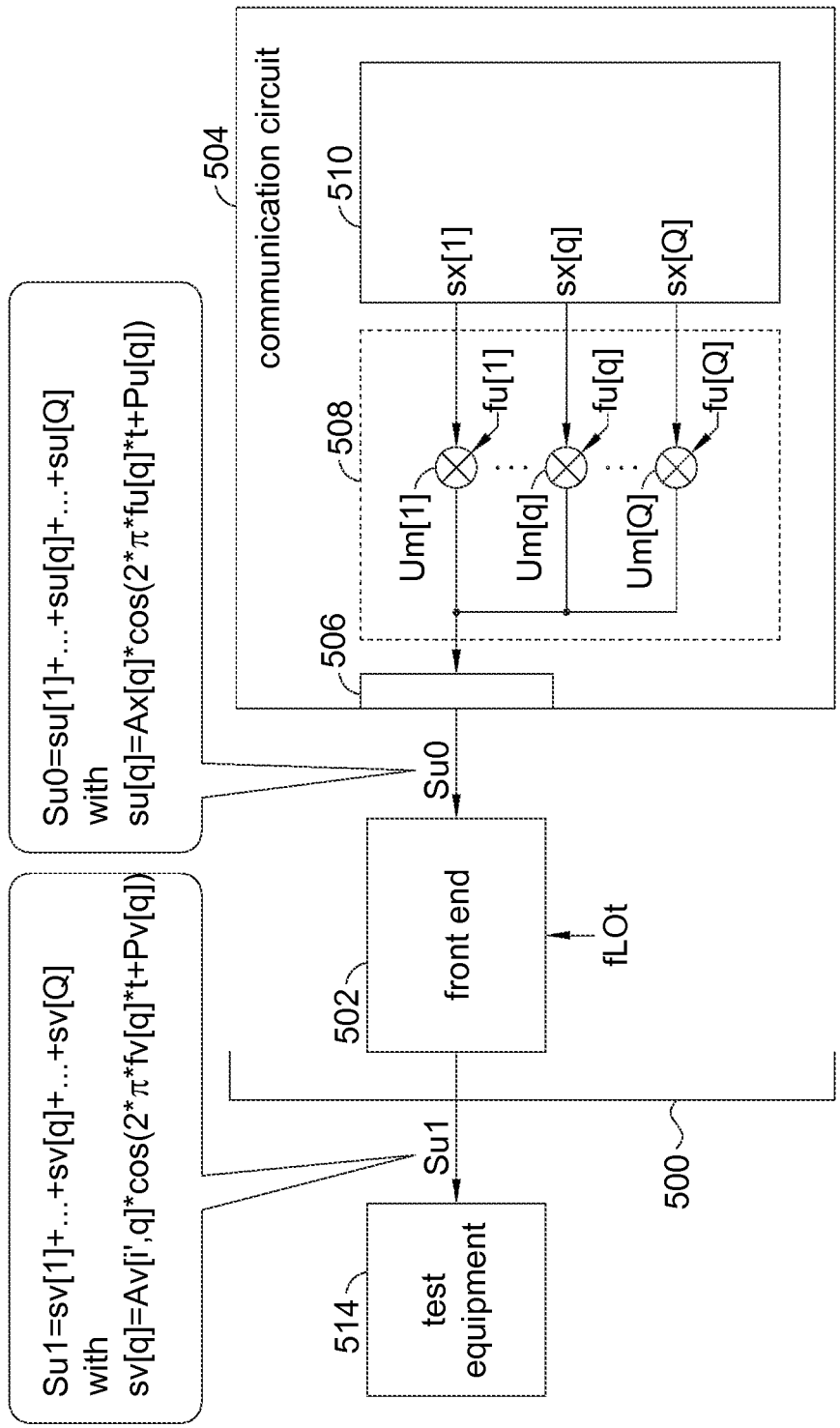
FIG. 5 illustrates a communication device according to an embodiment of the invention.
Figure 6:
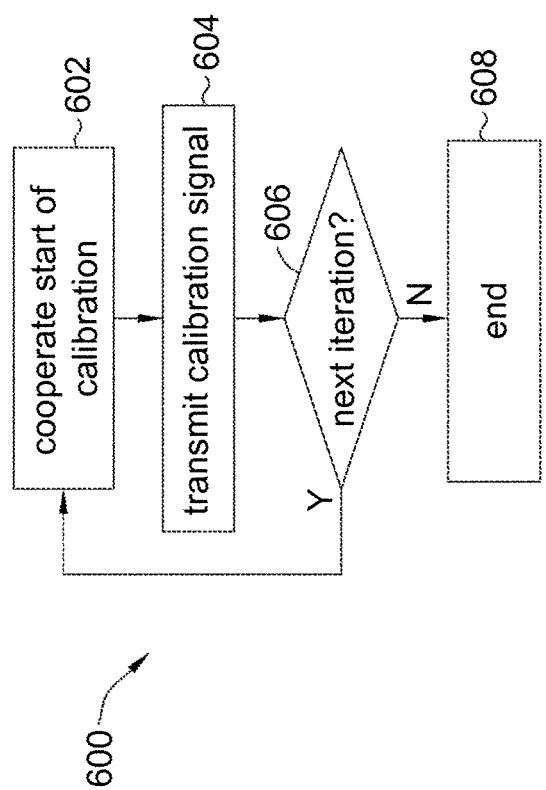
FIG. 6 illustrates a flowchart according to an embodiment of the invention, applicable to the communication device in FIG. 5.

Please refer to FIG. 5 and FIG. 6, respectively illustrating a communication device 500 and a flowchart 600 according to an embodiment of the invention. The communication device 500 may include a front end 502 (e.g., an RF analog front end) and a communication circuit 504 (e.g., a digital baseband processor or an application processor), and may adopt the flowchart 600 to calibrate transmit power accuracies of the communication device 500 in cooperation with an external test equipment 514.

The communication circuit 504 may include an interface 506; to implement the flowchart 600 according to the invention, the communication circuit 504 may further include a modulation block 508 and a calibration block 510. The calibration block 510 is capable of cooperating start of a calibration procedure by providing a plurality of baseband signals sx[1] to sx[Q]. The modulation block 508 may form a calibration signal Su0 according to the baseband signals sx[1] to sx[Q], such that the signal Su0 may include coexisting component signals su[1] to su[Q], and each component signal su[q] (for q=1 to Q) may be expressed by $Ax[q]*\cos(2**fu[q]*t+Pu[q])$, where terms $Ax[q]$, $fu[q]$ and $Pu[q]$ respectively are an amplitude, a frequency (as a calibration frequency) and a phase of the component signal su[q]; the terms $Ax[q]$ and $Pu[q]$ may be obtained from the baseband signal sx[q]. In an embodiment, the component signals su[1] to su[Q] may be organized according to OFDM, the frequencies fu[1] to fu[Q] may be OFDM subcarriers, and the modulation block 508 may provide the signal Su0 by fast Fourier transform. More generally, each of the component signals su[1] to su[Q] may be a single tone, so the signal Su0 may be a multi-tone signal composed by multiple tones at the frequencies fu[1] to fu[Q].

The interface 506 is capable of transmitting the signal Su0 from the communication circuit 504 to the test equipment 514 via the front end 502. The front end 502 may include one, some or all of the following: diplexer, coupler, duplexer, mixer (up-converter) and power amplifier. The front end 502 may operate in one or more modes for transmitting; in each mode, such as an i'-th mode, the front end 502 is capable of receiving the signal Su0 and accordingly providing a calibration signal Su1 in response, wherein the signal Su1 including component signals sv[1] to sv[Q], and each component signal sv[q] (for q=1 to Q) may be expressed by $Av[i',q]*\cos(2**fv[q]*t+Pv[q])$, where terms $Av[i',q]$, $fv[q]$ and $Pv[q]$ respectively are an amplitude, a frequency (as a calibration frequency) and a phase of the component signal sv[q]. For example, the front end 502 may up-convert the signal Su0 to the signal Su1 by a local oscillation frequency fLOt, such that the frequency fv[q] may equal a frequency sum (fLOt+fu[q]). In the i'-th mode, the front end 502 may also amplify the signal Su0 to the signal Su1, so the amplitude Av[i',q] may reflect transmit power accuracy (e.g., gain and/or path loss) at the frequency fv[q] in the i'-th mode.

As the test equipment 514 receives the signal Su1, the test equipment 514 may down-convert and demodulate the signal Su1 to obtain the amplitude Av[i',q] for calibrating transmit power accuracy of the communication device 500. For example, the test equipment 514 may be a vector signal analyzer (VSA) capable of measuring component signals included in the signal Su1.

As shown in FIG. 6, the flowchart 600 may be adopted to calibrate transmit power accuracy of the communication circuit 504 over a frequency range and over different modes (e.g., gain mode); the flowchart 600 may include the following steps.

Step 602: by the calibration block 510 (FIG. 5), cooperate start of a calibration procedure including subsequent step 604. During the calibration procedure, the front end 502 may be arranged (e.g., by control of the communication circuit 504) to keep operating in a same mode, e.g., an i'-th mode. The calibration block 510 may provide the signals sx[1] to sx[Q], and the modulation block 508 may modulate the signals sx[1] to sx[Q] to form the signal Su0, such that the signal Su0 may include the component signals su[1] to su[Q] at the frequencies fu[1] to fu[Q].

Step 604: by the interface 506, transmit the signal Su0 from the communication circuit 504 to the test equipment 514 via the front end 502, which provides the signal Su1 by up-converting and amplifying the signal Su0. In an embodiment, the frequencies fv[1] to fv[Q] of the signal Su1 may be arranged to distribute over the entire frequency range; alternatively, the frequencies fv[1] to fv[Q] may be arranged to distribute only over a portion of the frequency range. As the test equipment 514 receives the signal Su1, the test equipment 514 may evaluate transmit power accuracy of the communication device 500 at frequencies fv[1] to fv[Q] in the i'-th mode according to the component signals sv[1] to sv[Q].

Step 606: if there is a need to calibrate for another mode and/or another portion of the frequency range, proceed to step 602 to repeat the calibration procedure of steps 602 and 604; otherwise, proceed to step 608. For example, the flowchart 600 may iterate to step 602 for calibrate transmit power accuracy in (i'+1)-th mode; for calibration in the (i'+1)-th mode, the front end 502 may switch to operate in the (i'+1)-th mode.

For another example, the frequency range to be calibrated may further be divided to several portions, such as a first portion and a second portion. The first portion may be resolved by frequencies fvs[1] to fvs[Q1], and the second portion may be resolved by frequencies fvs[Q1+1] to fvs[Q2]. To calibrate over the frequency range in the same i'-th mode, steps 602 and 604 may be executed for a first iteration, during which the front end 502 is arranged to operate in the i'-th mode, and the frequencies fv[1] to fv[Q] are arranged to equal the frequencies fvs[1] to fvs[Q1]; then, the procedure 600 may branch back to step 602 from step 606, so steps 602 and 604 may be executed for a second iteration, during which the front end 502 may still be arranged to operate in the i'-th mode, but the frequencies fv[1] to fv[Q] are rearranged to equal the frequencies fvs[Q1+1] to fvs[Q2].

Step 608: end the flowchart 600.

Please note that the steps mentioned above are for illustration only, but not limitation. According to different design requirements, the order of the steps may be changed, one or more of the steps may be omitted, and one or more steps may be added before or after any of the steps mentioned above. The embodiments shown in FIG. 1 and FIG. 5 may be integrated into a same communication device; for example, the communication circuits 104 (FIG. 1) and 504 (FIG. 5) may respectively be a receiver portion and a transmitter portion of a baseband processor.

Figure 7:
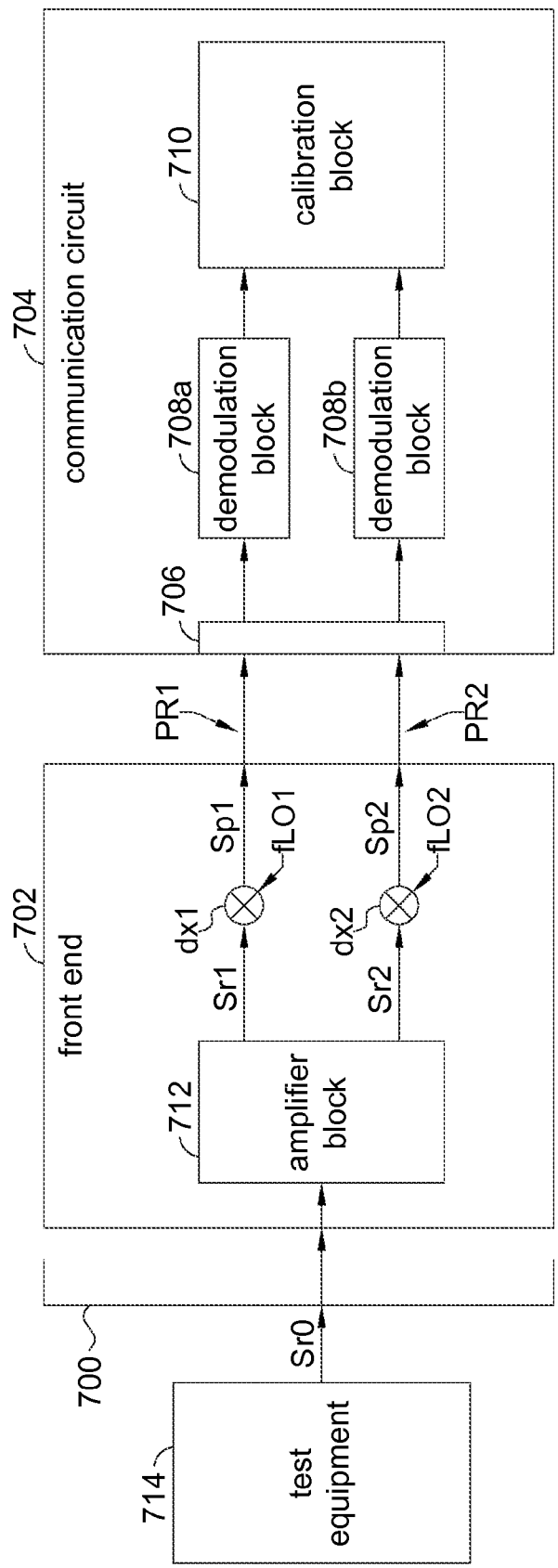
FIG. 7 illustrates a communication device according to an embodiment of the invention.

Please refer to FIG. 7 illustrating a communication device 700 according to an embodiment of the invention. The communication device 700 may be calibrated by connecting to a test equipment 714, which may provide a calibration signal Sr0 to calibrate power measurement accuracy of the communication device 700. The communication device 700 may include a front end 702 (e.g., analog RF front end) and a communication circuit 704 (e.g., a digital baseband processor) to implement two paths PR1 and PR2 of carrier aggregation, such that two coexisting signals of different carrier frequencies may be respectively received along the two paths PR1 and PR2.

For each of the paths PR1 and PR2, the front end 702 may selectively operate in one of a plurality modes. For example, the front end 702 may include an amplifier block 712 and two mixer units (e.g., down-converters) dx1 and dx2; while the front end 702 receives a signal, such as the signal Sr0, the amplifier block 712 may operate in one of different modes ma[1] to ma[N1] to amplify the signal Sr0 by one of different gains, and accordingly output an amplified signal Sr1 to the path PR1; the amplifier block 712 may operate in one of different modes mb[1] to mb[N2] to amplify the signal Sr0 by one of different gains, and accordingly output an amplified signal Sr2 to the path PR2. In an embodiment of dependent path mode, the modes for the paths PR1 and PR2 may be set with fixed dependency, e.g., the modes for the paths PR1 and PR2 may be the same (be of the same index); for example, the paths PR1 and PR2 may be designed to utilize same indexed modes ma[i] and mb[i], wherein the same indexed modes ma[i] and mb[i] may be associated with gains of equal value, and the quantities N1 and N2 both may equal a same quantity N. In an embodiment of independent path mode, the modes for the paths PR1 and PR2 may be set independently, e.g., the modes for the paths PR1 and PR2 may be of identical or different indices; for example, the paths PR1 and PR2 may be designed to flexibly utilize modes ma[i] and mb[j] respectively, wherein the indices i and j may be equal or different.

The mixer unit dx1 may mix (e.g., down-convert) the signal Sr1 by a local oscillation frequency fLO1 to form a mixed signal Sp1, and the mixer unit dx2 may mix (e.g., down-convert) the signal Sr2 by a local oscillation frequency fLO2 to form a mixed signal Sp2. The frequencies fLO1 and fLO2 may be different.

Ideally, power measurement accuracy of the path PR1 is expected to be uncorrelated to power measurement accuracy of the path PR2, and vice versa. However, in reality, performance of each path will be affected by the other path, because the two paths PR1 and PR2 may share same circuitry (e.g., matching network before the amplifier block 712) and/or closely placed circuitry. For example, a ratio between amplitudes of the signals Sp1 and Sr0 is ideally dependent only on modes of the path PR1 , regardless which mode the path PR2 is in. However, in reality, even when the path PR1 remains to operate in a same mode, the ratio between amplitudes of the signals Sp1 and Sr0 may suffer variation when the path PR2 switches between different modes. To actually reflect such unavoidable mutual correlation between the paths PR1 and PR2, it is desirable, according to the invention, to calibrate one path in context of various modes of the other path.

The communication circuit 704 may include an interface 706 coupled to the paths PR1 and PR2, and capable of signaling (e.g., receiving) the signals Sp1 and Sp2 respectively via the paths PR1 and PR2, in the modes ma[1] to ma[N1] of the path PR1 and the modes mb[1] to mb[N2] of the path PR2. For calibration power measurement accuracy, the communication circuit 704 may further include a calibration block 710, and two optional demodulation blocks 708a and 708b. For example, to calibrate power measurement accuracy of the path PR1 in context of modes of the path PR2, the calibration block 710 is capable of controlling modes of the paths PR1 and PR2, and therefore causing the interface 706 to signal (receive) the calibration signal Sr0 via the path PR1 in a mode ma[i] (for i selected from 1 to N1) and via the path PR2 in a mode mb[j] (for j selected from 1 to N2). Then, the calibration block 710 may change mode of the path PR2, and cause the interface 706 to signal the calibration signal Sr0 via the path PR1 in a mode ma[i'] and via the path PR2 in another mode mb[j'] (for j' selected from 1 to N2, excluding j). In the embodiment of dependent path mode, the indices i and j may be dependent (e.g., be identical); the indices i' and j' may also be dependent (e.g., be identical), but be different from the indices i and j. In the embodiment of independent path mode, the indices i and j may be independent (e.g., freely be identical or different), the indices i' and j' may be independent (e.g., freely be identical or different); and, the indices i and i' may identical; that is, the calibration block 710 may change mode of the path PR2 while maintaining mode of the path PR1.

In an embodiment, the signal Sr0 may include a plurality of component signals respectively at a plurality of calibration frequencies fr[1] to fr[K] (not shown), hence each of the signals Sp1 and Sp2 also includes a plurality of down-converted component signals. Accordingly, during calibration of the path PR1 in the mode ma[i] of the path PR1 and in context of the mode mb[j] of the path PR2, the demodulation block 708a, which is coupled to the path PR1, may demodulate the signal Sp1 received via the path PR1 to obtain a number K of baseband signals (not shown), similar to the demodulation block 108 shown in FIG. 1; and, the calibration block 710 is further capable of averaging squared absolute values of each baseband signal, similar to the calibration block 110 in FIG. 1. Thus, power measurement accuracy of the path PR1 at the frequencies fr[1] to fr[K], in the mode ma[i] and in context of the mode mb[j], may be obtained.

In an alternative embodiment, the signal Sr0 may be a single tone at a calibration frequencies fr[k], and the demodulation block 708a may be omitted. During calibration of the path PR1 in the mode ma[i] of the path PR1 and in context of the mode mb[j] of the path PR2, the calibration block 710 may average squared absolute values of the signal Sp1. Thus, a power measurement accuracy sample of the path PR1 at the frequency fr[k], in the modes ma[i] and in context of the mode mb[j], may be obtained.

Figure 8:
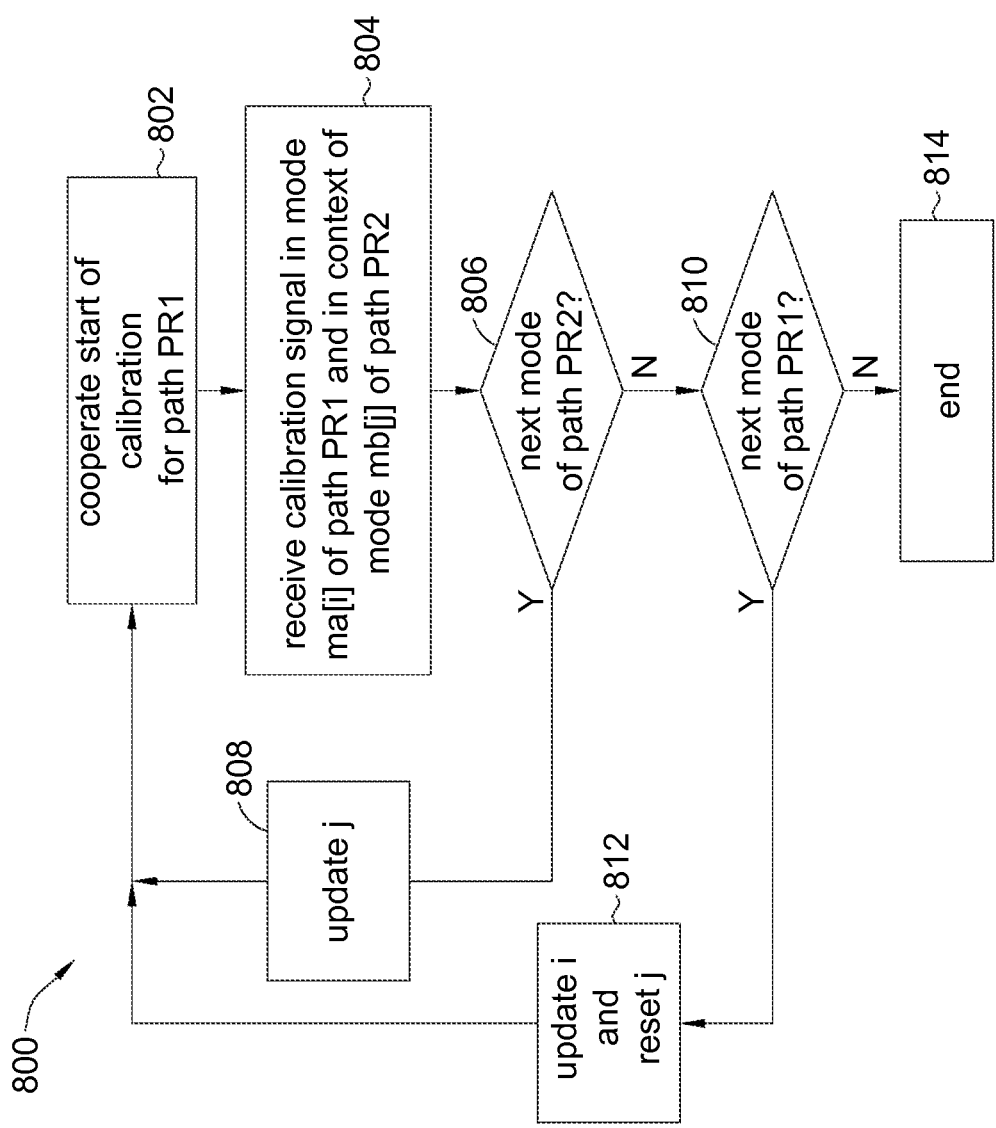
FIG. 8 illustrates a flowchart according to an embodiment of the invention, applicable to the communication device in FIG. 7.

Along with FIG. 7, please refer to FIG. 8 illustrating a flowchart 800 according to an embodiment of the invention. In the embodiment of independent path mode, the communication device 700 may adopt the flowchart 800 to calibrate power measurement accuracies of the path PR1, in context of modes of the other path PR2. The flowchart 800 may include following steps.

Step 802: cooperate start of a calibration operation including subsequent step 804. During the calibration operation, the calibration block 710 may cause (control) the path PR1 to operate in the mode ma[i], and cause the path PR2 to operate in the mode mb[j]. In the embodiment of independent path mode, the indices i and j may be independent (e.g., freely be identical or different).

Step 804: by the communication circuit 704, signal (receive) the calibration signal Sr0 via the path PR1 in the mode ma[i], and via the path PR2 in the second mode mb[j], between the test equipment 714 and the communication circuit 704. According to the received signal Sp1, the calibration block 710 may obtain power measurement accuracy of the path PR1, in the mode ma[i] and in context of the mode mb[j]. In an embodiment, the signal Sr0 may include multiple component signals at multiple frequencies fr[1] to fr[K] which resolve the frequency range to be calibrated, so power measurement accuracy of the path PR1, at the frequencies fr[1] to fr[K], in the mode ma[i] and in context of the mode mb[j], may be obtained. In an alternative embodiment, the signal Sr0 is a single CW tone at a single frequency, and the test equipment 714 may change frequency of the signal Sr0, from frequencies fr[1] to fr[K], respectively during a number K of calibration iterations; hence, in each calibration iteration, a power measurement accuracy sample, at one of the frequencies fr[1] to fr[K], in the mode ma[i] and in context of the mode mb[j], may be obtained. After the number K of calibration iterations, power measurement accuracy of the path PR1, at the frequencies fr[1] to fr[K], in the mode ma[i] and in context of the mode mb[j], may be collectively obtained.

Step 806: if there is another mode of path PR2 to be calibrated as a context, proceed to step 808, otherwise proceed to step 810.

Step 808: update mode of the path PR2 from the mode mb[j] to another mode mb[j'] (e.g., j'=j+1), and proceed to step 802, so steps 802 and 804 may repeat to obtain power measurement accuracy in the mode ma[i] of the path PR1 and in context of the mode mb[j'] of the path PR2.

Step 810: if there is another mode of path PR1 needed to be calibrated, proceed to step 812, otherwise proceed to step 814. From steps 806 to 810, power measurement accuracies of the path PR1, at the frequencies fr[1] to fr[K], in mode ma[i] of the path PR1, and in context of modes mb[1] to mb[N2] of the path PR2, are obtained.

Step 812: update mode of the path PR1 from the mode ma[i] to another mode ma[i'] (e.g., i'=i+1), reset mode of the path PR2 to an initial mode (e.g., mb[1]), and proceed to step 802, so steps 802, 804 and 806 may repeat to obtain power measurement accuracies of the path PR1, at the frequencies fr[1] to fr[K], in the mode ma[i'] of the path PR1 and in context of the modes mb[1] to mb[N2] of the path PR2.

Step 814: end the flowchart 800. Please note that the steps mentioned above are for illustration only, but not limitation. According to different design requirements, the order of the steps may be changed, one or more of the steps may be omitted, and one or more steps may be added before or after any of the steps mentioned above. Collectively, N1*N2*K power measurement accuracy samples of the path PR1, covering the frequencies fr[1] to fr[K] and the modes ma[1] to ma[N1] of the path PR1, respectively in context of the modes mb[1] to mb[N2] of the path PR2, may be obtained. The N1*N2*K power measurement accuracy samples may be evaluated by N1*N2 calibration operations (repeats of steps 802 and 804) if the calibration signal Sr0 contains multiple component signals at the frequencies fr[1] to fr[K], or alternatively by N1*N2*K calibration procedures within step 804, if the calibration signal Sr0 is a single tone at one of the frequencies fr[1] to fr[K].

By a similarity of the flowchart 800, power measurement accuracies of the path PR2, covering the frequencies fr[1] to fr[K] and the modes mb[1] to mb[N2] of the path PR2, respectively in context of the modes ma[1] to ma[N1] of the path PR1, may also be obtained. To calibrate power measurement accuracy of the path PR2 in context of modes of the path PR1, the calibration block 710 is capable of controlling modes of the paths PR1 and PR2, and therefore causing the interface 706 to signal (receive) the calibration signal Sr0 via the path PR1 in mode ma[i] (for i selected from 1 to N1) and via the path PR2 in mode mb[j] (for j selected from 1 to N2). Then, the calibration block 710 may change mode of the path PR1 while maintain mode of the path PR2, and cause the interface 706 to signal the calibration signal Sr0 via the path PR2 in the same mode mb[j] and via the path PR1in another mode ma[i'] (for i' selected from 1 to N1, excluding i).

In the embodiment where the signal Sr0 is composed by the frequencies fr[1] to fr[K], during calibration of the path PR2 in the mode mb[j] of the path PR2 and in context of the mode ma[i] of the path PR1, the demodulation block 708b, which is coupled to the path PR2, may demodulate the signal Sp2 received via the path PR2, and accordingly obtain a number K of baseband signals (not shown), similar to the demodulation block 108 shown in FIG. 1. The calibration block 710 is further capable of averaging squared absolute values of each baseband signal, similar to the calibration block 110 in FIG. 1. Thus, power measurement accuracy of the path PR2 at the frequencies fr[1] to fr[K], in the mode mb[j] and in context of the mode ma[i], may be obtained.

In an alternative embodiment where the signal Sr0 is a single tone at a single frequencies fr[k], so the demodulation block 708b may be omitted. During calibration of the path PR2 in the mode mb[j] of the path PR2 and in context of the mode ma[i] of the path PR1, the calibration block 710 may average squared absolute values of the signal Sp2. Thus, a power measurement accuracy sample of the path PR2 at the frequency fr[k], in the mode mb[j] and in context of the mode ma[i], may be obtained.

Figure 9:
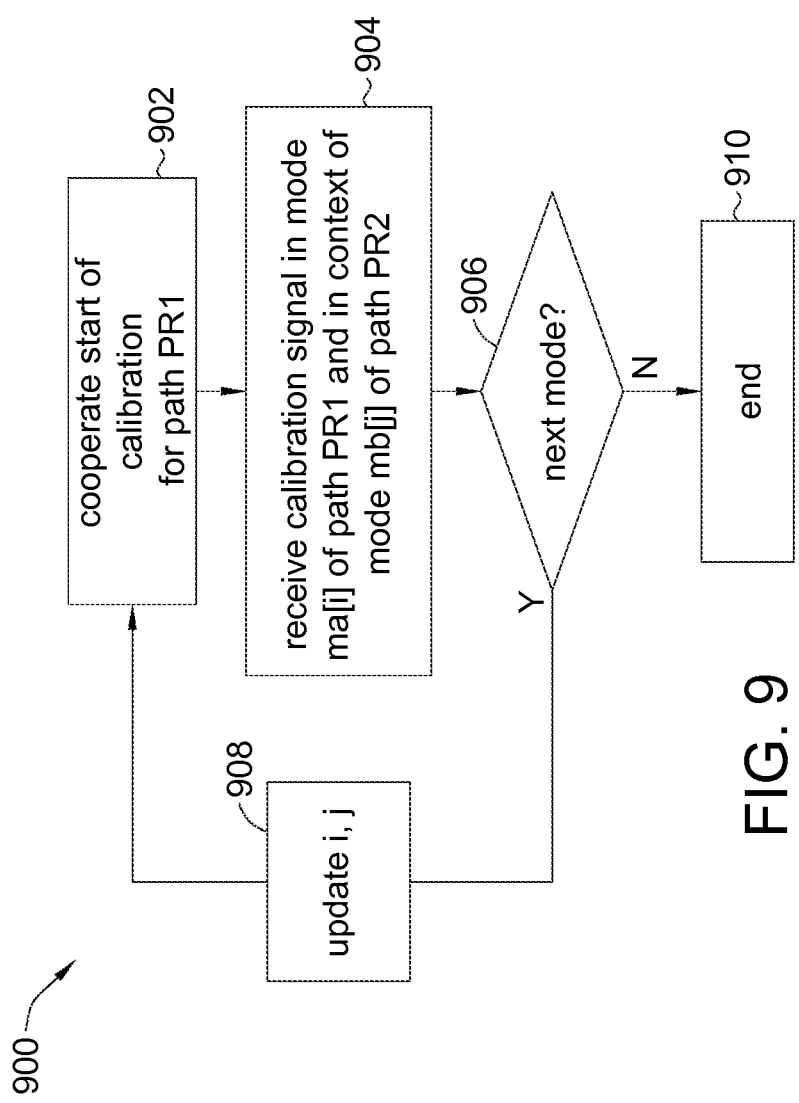
FIG. 9 illustrates a flowchart according to an embodiment of the invention, applicable to the communication device in FIG. 7.

Along with FIG. 7, please refer to FIG. 9 illustrating a flowchart 900 according to an embodiment of the invention. In the embodiment of dependent path mode, the communication device 700 may adopt the flowchart 900 to calibrate power measurement accuracies of the path PR1, in context of modes of the other path PR2. The flowchart 900 may be regarded as a simplified version of the flowchart 800 (FIG. 8), and may include following steps.

Step 902: cooperate start of a calibration operation including subsequent step 904. During the calibration operation, the calibration block 710 may cause (control) the path PR1 to operate in the mode ma[i], and cause the path PR2 to operate in the mode mb[j]. In the embodiment of dependent path mode, the indices i and j may be dependent (e.g., be identical).

Step 904: by the communication circuit 704, signal (receive) the calibration signal Sr0 via the path PR1 in the mode ma[i], and via the path PR2 in the second mode mb[j], between the test equipment 714 and the communication circuit 704. According to the received signal Sp1, the calibration block 710 may obtain power measurement accuracy of the path PR1, in the mode ma[i] and in context of the mode mb[j]. In an embodiment, the signal Sr0 may include multiple component signals at multiple frequencies fr[1] to fr[K] which resolve the frequency range to be calibrated, so power measurement accuracy of the path PR1, at the frequencies fr[1] to fr[K], in the mode ma[i] and in context of the mode mb[j], may be obtained. In an alternative embodiment, the signal Sr0 is a single CW tone at a single frequency, and the test equipment 714 may change frequency of the signal Sr0, from frequencies fr[1] to fr[K], respectively during a number K of calibration iterations; hence, in each calibration iteration, a power measurement accuracy sample, at one of the frequencies fr[1] to fr[K], in the mode ma[i] and in context of the mode mb[j], may be obtained. After the number K of calibration iterations, power measurement accuracy of the path PR1, at the frequencies fr[1] to fr[K], in the mode ma[i] and in context of the mode mb[j], may be collectively obtained.

Step 906: if there is another mode of path PR2 to be calibrated as a context, proceed to step 908, otherwise proceed to step 910.

Step 908: update modes of the paths PR2 and PR1 and proceed to step 902, so steps 902 and 904 may repeat to obtain power measurement accuracy in the mode ma[i] of the path PR1 and in context of the mode mb[j'] of the path PR2. Because modes of the path PR2 and PR1 are dependent, they may be both updated to maintain their dependency. For example, the mode mb[j] may be updated to another mode mb[j'], and the mode ma[i] may be updated to another mode ma[i'], e.g., j'=j+1, and i'=i+1.

Step 910: end the flowchart 900. Please note that the steps mentioned above are for illustration only, but not limitation. According to different design requirements, the order of the steps may be changed, one or more of the steps may be omitted, and one or more steps may be added before or after any of the steps mentioned above. Collectively, N*K power measurement accuracy samples of the path PR1, covering the frequencies fr[1] to fr[K] and each pair of dependent modes, e.g., (ma[1],mb[1]) to (ma[N],mb[N]), may be obtained. The N*K power measurement accuracy samples may be evaluated by N calibration operations (repeats of steps 902 and 904) if the calibration signal Sr0 contains multiple component signals at the frequencies fr[1] to fr[K], or alternatively by N*K calibration procedures within step 904, if the calibration signal Sr0 is a single tone at one of the frequencies fr[1] to fr[K].

By a similarity of the flowchart 900, power measurement accuracies of the path PR2, covering the frequencies fr[1] to fr[K] and N pairs of the dependent modes, e.g., (ma[1],mb[1]) to (ma[N],mb[N]), may also be obtained. To calibrate power measurement accuracy of the path PR2 in context of modes of the path PR1, the calibration block 710 is capable of controlling modes of the paths PR1 and PR2, and therefore causing the interface 706 to signal (receive) the calibration signal Sr0 via the path PR1 in a mode ma[i] (for selected from 1 to N1) and via the path PR2 in a dependent mode mb[j] (e.g., j=i). Then, the calibration block 710 may change mode of the paths PR1 and PR2, and cause the interface 706 to signal the calibration signal Sr0 via the path PR2 in a mode mb[j'] and via the path PR1 in another mode ma[i'].

Please note that though only two paths PR1 and PR2 are illustrated in FIGS. 7-9, embodiments of more than two paths are still within scope of the invention.

To sum up, the invention provides a technique for efficiently and thoroughly perform calibration on a communication circuit including a single path (e.g., the embodiments shown in FIG. 1 and FIG. 5) or more than one path of carrier aggregation (e.g., the embodiment in FIG. 7), and capable of signaling (receiving and/or transmitting) via each path in multiple modes. By leveraging calibration signal composed by multiple frequencies, much calibration resources, including time and cost, will be saved. By calibrating one path in context of various modes of the other path, cross correlation between paths may be thoroughly inspected, so as to ensure correct operation of communication device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for evaluating power measurement accuracy of signal in a carrier aggregation, the method comprising:
   transferring a first indication to a front end for indicating a first gain mode is used for a first path and a second gain mode is used for a second path; wherein the first path and the second path are two paths of carrier aggregation of the front end, and the first path and the second path have a same signal transferring direction;
   receiving a first calibration signal via the first path in the first gain mode of the first path and the second gain mode of the second path;
   obtaining an amplitude of the first calibration signal;
   transferring a second indication to the front end for changing the second gain mode to a fourth gain mode for the second path;
   receiving a second calibration signal via the first path in a third gain mode of the first path and the fourth gain mode of the second path; and
   obtaining an amplitude of the second calibration signal, wherein the amplitude of the first calibration signal and the amplitude of the second calibration signal are used for evaluating power measurement accuracy;
   wherein the second gain mode is different from the fourth gain mode, and, the third gain mode is identical to the first gain mode, or the fourth mode.

2. The method of claim 1, wherein the first calibration signal includes a first number of first component signals respectively at same number of first calibration frequencies.

3. The method of claim 2 further comprising:
   demodulating the first calibration signal signaled via the first path by a second number of first demodulation frequencies to respectively obtain same number of first baseband signals; and
   the step of obtaining the amplitude of the first calibration signal comprising:
   calculating powers of the second number of first baseband signals by averaging squared absolute values of each first baseband signal.

4. The method of claim 1 further comprising:
   the step of obtaining the amplitude of the first calibration signal comprising: calculating power of the first calibration signal by averaging squared absolute values of the first calibration signal.

5. A communication circuit, comprising:
   an interface for signaling a second signal, wherein the second signal includes a plurality of coexisting second components respectively at a plurality of second frequencies; wherein the second signal is generated by using a first gain mode according to a first signal and the first signal includes a plurality of coexisting first components respectively at a plurality of first frequencies;
   a calibration block for obtaining a plurality of amplitudes of the plurality of coexisting second components, wherein each of the plurality of amplitudes of the plurality of coexisting second components is used for evaluating power measurement accuracy at a corresponding one of the plurality of first frequencies in the first gain mode.

6. The communication circuit of claim 5 further comprising:
   a demodulation block coupled to the interface, and configured for demodulating the second signal by a plurality of demodulation frequencies to respectively obtain a plurality of baseband signals; and
   wherein the calibration block is arranged to obtain the plurality of amplitudes of the plurality of coexisting second components by: calculating powers of the plurality of baseband signals.

7. The communication circuit of claim 6 further comprising:
   a frequency setting block, coupled to the demodulation block, and configured for performing a frequency error compensation by tuning at least one value of the plurality of demodulation frequencies to keep the sum of the tuned value and a LO frequency of a front end equals to a corresponding first frequency, wherein the second signal is generated by the front end according to the first signal.

8. The communication circuit of claim 6, wherein the calibration block is arranged to calculate the powers of the plurality of baseband signals by:
   averaging squared absolute values of each baseband signal.

9. The communication circuit of claim 5, wherein each first component is a single tone.

10. The communication circuit of claim 5, wherein the plurality of coexisting first components is organized according to OFDM to form the first signal.

11. A communication circuit comprising:
    an interface coupled to a first path and a second path of carrier aggregation of a front end, and configured for signaling via the first path in a plurality of first modes and via the second path in a plurality of second modes; and
    a calibration block configured for:
    transferring a first indication to the front end for indicating a first gain mode is used for the first path and a second gain mode is used for the second path, and receiving a first calibration signal via the first path in the first gain mode of the first path and the second gain mode of the second path through the interface, and obtaining an amplitude of the first calibration signal, wherein the amplitude of the first calibration signal is used for evaluating power measurement accuracy; and
    transferring a second indication to the front end for changing the second gain mode to a fourth gain mode for the second path, and receiving a second calibration signal via the first path in a third gain mode of the second path and the fourth gain mode of the second path through the interface, and obtaining an amplitude of the second calibration signal, wherein the amplitude of the second calibration signal is used for evaluating power measurement accuracy;
    wherein the second gain mode is different from the fourth gain mode; and, the third gain mode is identical to the first gain mode, or the fourth gain mode.

12. The communication circuit of claim 11, wherein the first calibration signal includes a plurality of component signals respectively at same number of calibration frequencies; and the communication circuit further comprising:
    a first demodulation block coupled to the first path, and configured for demodulating the first calibration signal signaled via the first path to respectively obtain a plurality of first baseband signals;

wherein the calibration block is configured for obtaining an amplitude of the first calibration signal by: averaging squared absolute values of each first baseband signal.

13. The communication circuit of claim 11, wherein the calibration block is configured for obtaining an amplitude of the first calibration signal by: averaging squared absolute values of the first calibration signal signaled via the first path.

14. A method for evaluating power measurement accuracy, comprising:

receiving a first signal by a front end, wherein the first signal includes a plurality of coexisting first components respectively at a plurality of first frequencies;

processing the received first signal in a first gain mode to obtain a second signal by the front end; wherein the second signal comprises a plurality of coexisting second components respectively at a plurality of second frequencies corresponding to the plurality of first frequencies;

receiving the second signal by a communication circuit from the front end;

obtaining a plurality of amplitudes of the plurality of coexisting second components according to the second signal, by the communication circuit, wherein each of the plurality of amplitudes of the plurality of coexisting second components is used for evaluating power measurement accuracy at a corresponding one of the plurality of first frequencies in the first gain mode.

15. The method of claim 14, further comprising:

demodulating the second signal by a plurality of demodulation frequencies to obtain a plurality of baseband signals, by the communication circuit;

the step of obtaining the plurality of amplitudes of the plurality of second components according to the second signal comprising: calculating powers of the plurality of baseband signals to obtain a plurality of results indicative of the plurality of amplitudes of the plurality of second components.

16. The method of claim 15, wherein each of the plurality of amplitudes of the plurality of second components is used for evaluating receiving power measurement accuracy at the corresponding first frequency in the first gain mode.

17. The method of claim 15, wherein the plurality of demodulation frequencies comprising a plurality of third frequencies, further comprising:

performing a frequency error compensation by tuning at least one value of the plurality of third frequencies to keep a sum of the tuned value and a LO frequency of the front end equals to a corresponding first frequency.

18. The method of claim 15, wherein calculating powers of the plurality of baseband signals comprises:

averaging squared absolute values of each baseband signal.

19. The method of claim 14, wherein each first component is a single tone.

20. The method of claim 14, wherein the plurality of coexisting first components is organized according to OFDM (orthogonal frequency-division multiplexing).

21. The method of claim 14, wherein the first signal is generated according to a plurality of baseband signals, and each of the plurality of amplitudes of the plurality of second components is used for evaluating transmitting power measurement accuracy at a corresponding one of the plurality of first frequencies in the first gain mode.

* * * * *